US011035768B2

(12) United States Patent
Bodemann

(10) Patent No.: US 11,035,768 B2
(45) Date of Patent: Jun. 15, 2021

(54) EARLY WARNING SYSTEM FOR ERROR DETECTION IN NITROGEN GENERATORS

(71) Applicant: South-Tek Systems, LLC, Wilmington, NC (US)

(72) Inventor: Scott Christian Bodemann, Wilmington, NC (US)

(73) Assignee: South-Tek Systems, LLC, Wilmington, NC (US)

( * ) Notice: Subject to any disclaimer, the term of this patent is extended or adjusted under 35 U.S.C. 154(b) by 197 days.

(21) Appl. No.: 16/219,437

(22) Filed: Dec. 13, 2018

(65) Prior Publication Data

US 2019/0178768 A1    Jun. 13, 2019

Related U.S. Application Data

(60) Provisional application No. 62/598,115, filed on Dec. 13, 2017.

(51) Int. Cl.

| G01N 7/14 | (2006.01) |
| G05B 23/02 | (2006.01) |
| A62C 99/00 | (2010.01) |
| A62C 35/64 | (2006.01) |
| A62C 35/68 | (2006.01) |
| G05B 19/042 | (2006.01) |

(52) U.S. Cl.
CPC ............. *G01N 7/14* (2013.01); *A62C 35/645* (2013.01); *A62C 35/68* (2013.01); *A62C 99/0018* (2013.01); *G05B 19/042* (2013.01); *G05B 23/027* (2013.01)

(58) Field of Classification Search
None
See application file for complete search history.

(56) References Cited

U.S. PATENT DOCUMENTS

| 2010/0263882 A1* | 10/2010 | Bodemann | F16K 15/04 |
| | | | 169/17 |
| 2012/0067205 A1* | 3/2012 | Pendzich | B01D 53/265 |
| | | | 95/17 |
| 2013/0168109 A1* | 7/2013 | Kochelek | A62C 35/68 |
| | | | 169/17 |
| 2017/0305576 A1* | 10/2017 | Al-Yafawi | B01D 53/22 |
| 2018/0214725 A1* | 8/2018 | Tihen | B01D 69/08 |

* cited by examiner

*Primary Examiner* — Jason M Greene
(74) *Attorney, Agent, or Firm* — Coats & Bennett, PLLC

(57) ABSTRACT

In a nitrogen generator, multiple, concurrent gas pressure monitors constantly and simultaneously monitor gas pressures at key points in the nitrogen generation process, and a controller generates an alarm when the pressure at any point falls below a respective predetermined pressure level, and remains there for longer than a respective predetermined duration. In some embodiments, a run time of the nitrogen separation unit is additionally monitored. Additionally, in some embodiments, if the output pressure of nitrogen gas falls below a predetermined pressure level, a bypass route is activated to route compressed air directly to the output, thus sacrificing nitrogen gas purity but maintaining required minimum pressure for downstream systems.

20 Claims, 3 Drawing Sheets

EARLY WARNING SYSTEM FOR ERROR DETECTION IN NITROGEN GENERATORS

This application claims priority to U.S. Provisional Patent Application Ser. No. 62/598,115, filed Dec. 13, 2017, the disclosure of which is incorporated herein by reference, in its entirety.

FIELD OF INVENTION

The present invention relates generally to nitrogen generators, and in particular to a system and method for early detection and warning of errors in nitrogen generator operation.

BACKGROUND

Nitrogen gas (N2) is colorless, orderless, chemically inert gas with a very low dew point. Nitrogen gas (also referred to herein simply as nitrogen or N2) is used industrially in numerous applications to reduce the hazard or deleterious effects of oxygen. For example, fruits and vegetables are transported and stored in a nitrogen environment to retard spoliation. Nitrogen is used in lieu of air in many applications, such as to provide supervisory pressure in "dry pipe" fire protection sprinkler systems, to avoid the corrosive effects of oxygen. Similarly, high purity nitrogen gas replaces the air over fuel tanks in aircraft and ships, and is discharged around welding equipment, to mitigate fire and explosion hazard. It is used to inflate tires of aircraft and race cars to eliminate problems due to moisture and oxygen.

Atmospheric air comprises approximately 78% nitrogen and 21% oxygen (and 1% "other"). Because nitrogen molecules (N2) are larger (3.1 Å) than oxygen molecules (O2, 2.9 Å), the two gases are easily separated, such as by passing pressurized air through an appropriate permeable membrane, or adsorbing one gas on the surface of an appropriate medium. Modern industrial nitrogen generators can thus provide a virtually unlimited supply of free, high-purity nitrogen gas (of course, the filter or adsorption media have a cost, and the overall generator has operating costs).

Although conceptually simple, real-world N2 generators are complex systems, with numerous components, and hence numerous potential failure points. Failure of a N2 generator could result in a low purity of nitrogen gas being delivered, which may negate the benefits of using nitrogen gas, and/or loss of pressure, which may have dire consequences. Typically, the purity of nitrogen gas output by a N2 generator is monitored, such as by using oxygen sensors. A drop in purity may cause the system to be shut down, and diagnostic procedures performed to isolate and repair the fault. This down time may be costly, and may impact the operation of the downstream, nitrogen-using process. Other than sampling the output, known nitrogen generators do not include internal monitoring or diagnostic functions.

The Background section of this document is provided to place embodiments of the present invention in technological and operational context, to assist those of skill in the art in understanding their scope and utility. Approaches described in the Background section could be pursued, but are not necessarily approaches that have been previously conceived or pursued. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

According to one or more embodiments described and claimed herein, in a nitrogen generator, multiple, concurrent gas pressure monitors constantly monitor gas pressures at key points in the nitrogen generation process, and a controller generates an alarm when the pressure at any point falls below a respective predetermined pressure level, and remains there for longer than a respective predetermined duration. In some embodiments, a run time of the nitrogen separation unit is additionally monitored. Additionally, in some embodiments, if the output pressure of nitrogen gas falls below a predetermined pressure level, a bypass route is activated to route compressed air directly to the output, thus sacrificing nitrogen gas purity but maintaining required minimum pressure for downstream systems.

One embodiment relates to a nitrogen generator. The nitrogen generator includes a compressed air inlet adapted to be connected to an air compressor and to receive compressed air, and a gas pressure monitor connected to the inlet. The nitrogen generator also includes an air dryer operative to remove moisture from the compressed air received at the compressed air inlet, and a gas pressure monitor connected to an output of the air dryer. The nitrogen generator further includes a nitrogen separation unit operative to separate nitrogen gas from the dried, compressed air and to pass the nitrogen gas to a nitrogen gas output, and a gas pressure monitor connected to the nitrogen gas output. Still further, the nitrogen generator includes a controller connected to the gas pressure monitors, and adapted to generate an alarm if any monitored gas pressure falls below a respective predetermined pressure level for greater than a respective predetermined duration.

Another embodiment relates to a method of operating a nitrogen generator. The nitrogen generator includes a compressed air inlet adapted to be connected to an air compressor and to receive compressed air, an air dryer operative to remove moisture from the compressed air received at the compressed air inlet, a nitrogen separation unit operative to separate nitrogen gas from the dried air and to pass the nitrogen gas to a nitrogen gas output, a plurality of gas pressure monitors, and a controller. Gas pressure is monitored at the compressed air inlet, at an output of the air dryer, and at the nitrogen gas output. An alarm is generated if any monitored gas pressure falls below a respective predetermined pressure level for greater than a respective predetermined duration.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

DETAILED DESCRIPTION

Figure 1:
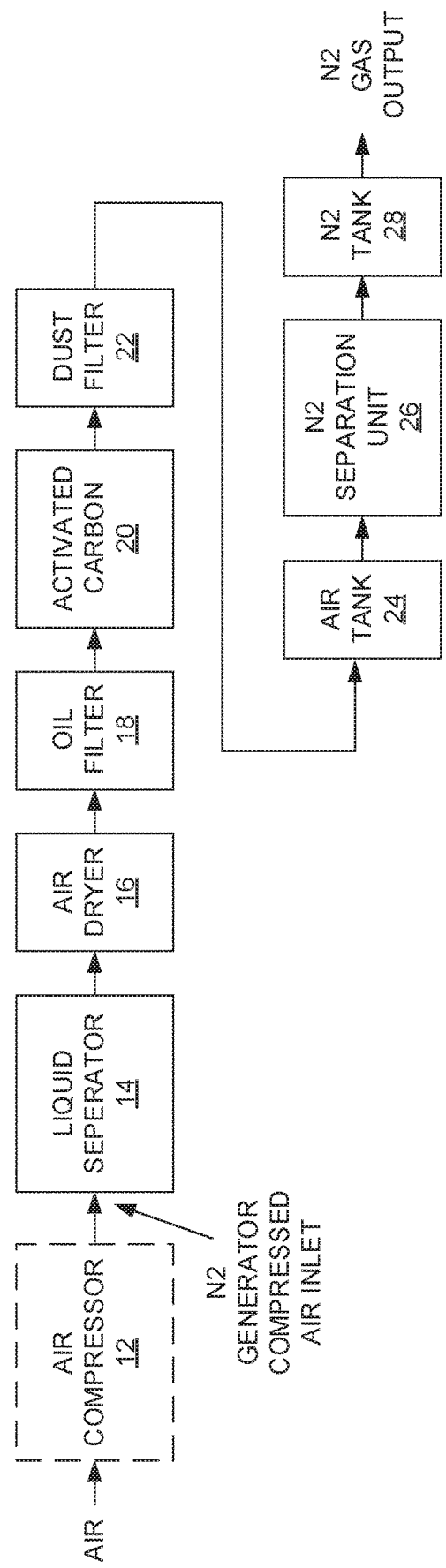
FIG. 1 is a block diagram of a conventional nitrogen generator.

For simplicity and illustrative purposes, the present invention is described by referring mainly to an exemplary embodiment thereof. In the following description, numerous specific details are set forth in order to provide a thorough understanding of the present invention. However, it will be readily apparent to one of ordinary skill in the art that the present invention may be practiced without limitation to these specific details. In this description, well known methods and structures have not been described in detail so as not to unnecessarily obscure the present invention.

Embodiments of the present invention are disclosed herein in the context of a Pressure Swing Adsorption (PSA) nitrogen generator, providing nitrogen gas to a dry pipe or preaction type Fire Protection System (FPS) sprinkler. However, those of skill in the art will readily recognize that the enhanced safety and reliability provided by embodiments of the present invention will accrue to any type of nitrogen generator, operated in any application.

FPS sprinklers are a well-known type of active fire suppression system. Sprinklers are installed in all types of buildings, commercial and residential, and are generally required by fire and building codes for buildings open to the public. Typical sprinkler systems comprise a network of pipes, usually located at ceiling level, that are connected to a reliable water source. Sprinkler heads are disposed along the pipes at regular intervals. Each sprinkler head includes a fusible element, such as a frangible glass bulb, that is heat-sensitive and designed to fail at a predetermined temperature. Failure of the fusible element or glass bulb opens an orifice, allowing water to flow through the head, where it is directed by a deflector into a predetermined spray pattern. Sprinkler systems may suppress a fire, or inhibit its growth, thereby saving lives and limiting inventory loss and structural damage. Sprinkler specifications are published by the National Fire Protection Association (e.g., NFPA 13).

The most basic fire protection sprinkler system is a "wet pipe" system, wherein the sprinkler pipes are full of water under a predetermined "internal set point" pressure. If the water pressure decreases below the set point, valves are opened and in some cases a pump is activated, and water flows into the sprinkler pipes in an attempt to maintain the pressure. The set point pressure drops when water escapes the system, such as due to the opening of a sprinkler head in the event of a fire.

In environments exposed to freezing temperatures, such as parking garages or freezers, or in environments where accidental water discharge would be catastrophic, such as data center server rooms, "dry pipe" sprinklers are used. In a dry pipe sprinkler system, a water valve in a riser room holds back water, and the pipes are filled with compressed air or nitrogen gas at or above a "supervisory pressure" sufficient to hold the water valve closed. When the pressure drops, such as by a sprinkler head being opened by a fire, the water valve opens and the piping floods with water, which exits the open sprinkler head to extinguish the fire. A "preaction" FPS sprinkler is a dry pipe system that requires a signal, such as from a fire or smoke detector, in addition to the loss of supervisory pressure, to open the water valve.

Nitrogen gas is often used to maintain supervisory pressure in dry pipe and preaction FPS sprinklers, in lieu of air, to combat corrosion. The piping system is purged of air (which contains oxygen), and filled with inert nitrogen gas. Rust (oxidation) and other forms of corrosion, including Microbiologically Influenced Corrosion (MIC) are retarded by the use of nitrogen gas. In this application, maintaining the proper nitrogen gas pressure in the FPS piping network is critical—if the pressure were to drop due to a malfunction of the nitrogen generator, the water valve may open and flood the pipes with water, possibly causing leaks, damage to computers or inventory, and creating a slipping hazard in areas open to the public.

There are two primary types of nitrogen generators: membrane and PSA. Both types exploit the mismatch in size between oxygen (O2) and nitrogen (N2) molecules, to separate nitrogen gas from oxygen in compressed atmospheric air.

FIG. 1 is a block diagram of a representative nitrogen generator 10, which may be of the membrane or PSA type. A full nitrogen generator 10 may include an air compressor 12, liquid separator 14, air dryer 16, oil filter 18, activated carbon filter 20, dust filter 22, process air tank 24, membrane nitrogen separation unit 26 (membrane or PSA), and process nitrogen tank 28. An air compressor 12 compresses atmospheric air to about 100-350 pounds per square inch (psi). As indicated by the dashed lines, the air compressor is often not considered part of the nitrogen generator 10. For example, an industrial building may already be equipped with one or more air compressors 10, which air may be used by the nitrogen generator. In general, however, a stand-alone nitrogen generator 10 will include an air compressor 12. An optional liquid separator 14 removes bulk water and oil from the compressed air. An air dryer 16 condenses and removes moisture from the compressed air. In some applications, the air dryer 16 may comprise a refrigerated dryer that reduces the compressed air dewpoint below 38° F. In freezing hazard environments, a desiccant dryer may be used. In nitrogen generators 10 deploying a membrane type N2 separation unit 26, an air dryer 16 may not be required.

An optional oil filter 18 may remove (or reduce) oil aerosols. Some amount of oil vapor is typically present in compressed air when the air compressor 12 is a lubricated type. As one example, a 0.01 micron coalescing filter will reduce oil aerosols to less than 0.0008 parts per million (ppm). Even when an oil filter 18 is used, some oil vapor will be present in the compressed air when a lubricated air compressor 12 is used. This oil, as well as other hydrocarbons and impurities, can be removed by passing the dried, compressed air over activated carbon, either in a cartridge or a bed of activated carbon pellets. In nitrogen generators 10 deploying a membrane type N2 separation unit 26, a dust filter 22 is preferably interposed in the air feed line, to remove dust that may clog the filter pores and reduce filter life. The dust filter 22 is not present in a nitrogen generator 10 deploying a PSA type N2 separation unit 26.

Depending on the size and type of N2 separation unit 26 (i.e., membrane or PSA), one, both, or none of the air tank 24 and N2 tank 28 may be required. Small nitrogen generators 10 of the membrane type may require no storage tanks—a continuous feed of compressed air generates a continuous feed of nitrogen gas, which may be sufficient for many applications. In applications where the demand for nitrogen gas is variable (e.g., driving beverages to taps in a bar or restaurant), only the N2 tank 28 may be required. In nitrogen generators 10 deploying a PSA type N2 separation unit 26, the N2 tank 28 is required, as explained below, due to the cyclic operation of the N2 separation unit 26.

The heart of a nitrogen generator 10 is the N2 separation unit 26. As discussed, there are two primary types: membrane and PSA. The membrane type N2 separation unit 26 separates nitrogen gas from oxygen in dried, compressed air by the straightforward method of passing the air through a permeable membrane having pores sized to allow the smaller O2 molecules to pass and be discharged as waste gas, while retaining the larger N2 molecules. These are collected at the output into an N2 tank 28, or passed directly to the downstream process.

A Pressure-Swing Adsorption (PSA) type N2 separation unit 26 operates to remove O2 molecules from the dried, compressed airstream by adsorbing them onto the surface of a carbon-molecular sieve (CMS). The CMS material has pores in its surface that correspond to the size of the O2 molecules. As the dried, compressed air passes over the CMS media, As molecules are adsorbed into the pores, and the N2 molecules pass through the media to be output as high purity N2 gas. In time, the CMS media becomes saturated with adsorbed O2 molecules, and cannot adsorb more. This condition is reversed by depressurizing the media to ambient atmospheric pressure, when the O2 molecules are released and discharged as waste gas. To obtain a near-continuous flow of N2 gas, most PSA type N2 separation units 26 operate with at least two instances of CMS media—one is utilized to separate N2 gas while the other is regenerated. The two are then swapped; the PSA type N2 separation unit 26 thus operates in a "ping-pong" fashion, alternating the two instances of CMS media. When one instance is transitioned from regeneration to N2 generation, it must first be pressurized, and no N2 gas is generated during this time. Accordingly, the N2 tank 28 is required to even out the intermittent flow of N2 gas.

Both types of nitrogen generators 10—membrane and PSA—are subject to leaks and other faults at numerous points along the process, any one of which may render the nitrogen generators 10 inoperative for a given purpose. According to embodiments of the present invention, numerous points of the system are simultaneously monitored to ensure proper operation. If pressure is too low at any point—or if the N2 separation unit 26 runs for an excessive time—alarms are generated and displayed, alerting users that corrective action may be necessary.

Figure 2:
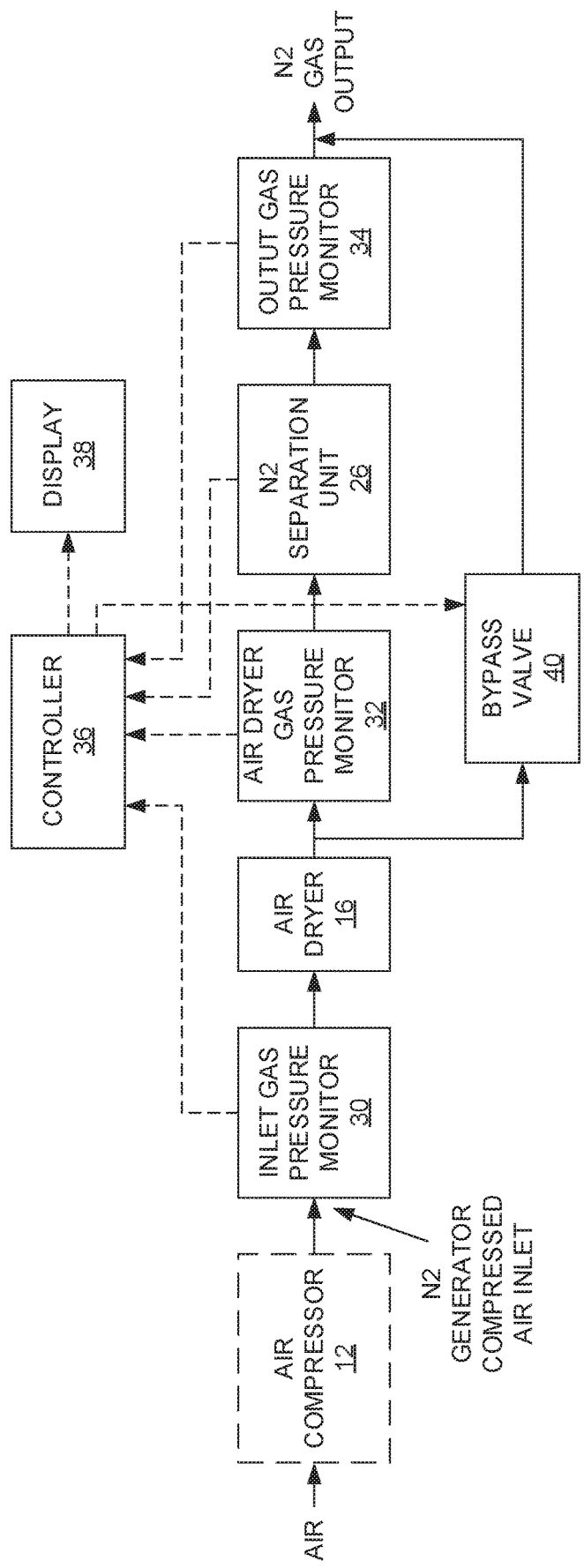
FIG. 2 is a block diagram of a nitrogen generator with multiple, simultaneous pressure monitors reporting to a controller.

FIG. 2 depicts only the critical portions of a nitrogen generator 10—that is, the air compressor 12, air dryer 16, and N2 separation unit 26. Other components depicted in FIG. 1 may be present, but are omitted from the view of FIG. 2 for clarity. In FIG. 2, solid lines represent gas flow; dashed lines indicate control signaling. As in FIG. 1, the air compressor is depicted in dashed lines to indicate it may be an internal component of the nitrogen generator 10 or it may be external.

According to embodiments of the present invention, gas pressure monitors 30, 32, 34 continuously and simultaneously monitor gas pressure at critical points in the nitrogen generator 10. A controller 36 receives the gas pressure monitor 30, 32, 34 signals and generates an alarm, such as a message displayed on a display 38, if any gas pressure monitor 30, 32, 34 detects a gas pressure below a respective predetermined pressure level for greater than a respective predetermined duration.

In particular, an inlet gas pressure monitor 30 monitors the pressure of compressed air at the nitrogen generator 10 compressed air inlet. If the air compressor 12 fails or malfunctions, the system air pressure may be insufficient to drive sufficient air through a permeable membrane, or CMS media of a PSA, in the N2 separation unit, which may result in low purities of N2 gas—that is, too many O2 molecules will remain in the gas. Similarly, a gas pressure monitor 32, connected between the air dryer 16 and the N2 separation unit 26, monitors the pressure of dried air at the input to the N2 separation unit 26, for the same reason. By monitoring both gas pressure monitors 30, 32, the controller 36 can ascertain whether the air compressor 12 or the air dryer 16 is malfunctioning. An output gas pressure monitor 34 measures the pressure of N2 gas at the output of the N2 separation unit 26. A N2 gas pressure lower than expected may indicate a failure or malfunction of the N2 separation unit 26. For example, a low pressure may indicate that the permeable membrane of a membrane type N2 separation unit 26 is torn, allowing N2 molecules to escape along with the 02.

The gas pressure monitors 30, 32, 34 may be of any type of pressure transducer known in the art. In one embodiment, one or more gas pressure monitors 30, 32, 34 comprise an adjustable or fixed pressure switch, which actuates an electrical switch in response to the monitored pressure. Actuation of the switch may cause a low voltage, e.g., 24 VDC, to be present at a corresponding input of the controller 36. A suitable gas pressure monitor 30, 32, 34 is the [model], available from [company] of [city]. In another embodiment, one or more gas pressure monitors 30, 32, 34 comprise a pressure sensor, which outputs an analog or digital signal to the controller 36 indicative of the monitored pressure. In these embodiments, the controller 36 compares the indicated pressure to predetermined pressure level values.

In one embodiment, the predetermined minimum pressure levels of all gas pressure monitors 30, 32, 34 are the same. However, in other embodiments, a first predetermined pressure level for at least a first gas pressure monitor is different than a second predetermined pressure level for a second gas pressure monitor. For example, in membrane type N2 separation units 26, the output pressure is normally lower than the input pressure, due to loss of the escaping O2 molecules. Accordingly, the output gas pressure monitor 34 may be adjusted to report (or may be compared to) a lower predetermined minimum pressure level than that to which the compressed air inlet gas pressure monitor 30 is adjusted or compared.

Unlike a simple pressure sensor, the controller 36 is operative to generate an alarm only if one or more gas pressure monitors 30, 32, 34 indicate a gas pressure lower than a respective predetermined pressure level, that persists below that pressure level for greater than a respective predetermined duration. As described above, in a PSA type N2 separation unit 26, a brief period of low pressure is to be expected every time the unit switches air flow from one CMS media bed to the other, as the newly active media bed is pressurized. Accordingly, the controller 36 would not generate an alarm for a brief pressure drop at the output of a PSA type N2 separation unit 26, as indicated by the output gas pressure monitor 34. Rather, the low pressure must persist for greater than a predetermined duration to generate an alarm. In one embodiment, the duration is 30 minutes. In general, each respective predetermined duration may be different. That is, in one embodiment a low pressure detected by a first gas pressure monitor must persist for greater than a first predetermined duration to generate an alarm, while a low pressure detected by a second gas pressure monitor must persist for at least a second predetermined duration to generate an alarm, wherein the first and second durations are different.

The nitrogen generator 10 can detect not only a pressure leak within its own components, but also, in some cases, in a downstream system. For example, a large leak in a downstream pressurized system would result in a drop of N2 gas pressure at the N2 gas output, and be detected by the output gas pressure monitor 34. However, in some cases, a downstream system may have a leak but not cause a large pressure drop. For example, if a dry pipe FPS sprinkler develops a slow leak, the nitrogen generator 10 may be able to "keep up" in terms of maintaining pressure; however, the nitrogen generator 10 must run continuously, incurring operating costs, wear and tear, and depleting the useful life of the N2 separation media. According to one embodiment, this is detected by a run time monitor in the controller 36.

In one embodiment, the N2 separation unit 26 indicates to the controller 36 when it is active and generating nitrogen gas from compressed air. The controller 36 monitors this run time. If the N2 separation unit 26 run time exceeds a predetermined duration, such as for example 30 minutes, the controller 36 will generate an alarm. This additional alarm will detect situations such as the slow leak described above, and will alert personnel to inspect the downstream system, e.g., the FPS sprinkler piping, for a slow N2 gas leak.

In one embodiment, the controller monitors not only straight run time, but also cumulative run time over a longer duration. For example, a nitrogen generator 10 that collects nitrogen gas in a N2 tank 28 (see FIG. 1) may be deployed to drive beverages from kegs to taps in a bar or restaurant. The N2 separation unit 26 will activate intermittently, as necessary to maintain a minimum pressure in the N2 tank 28. During normal operation, the N2 tank 28 will partially deplete, and require the nitrogen generator 10 to replenish it only a few times a night. However, if a tap were inadvertently left open, the nitrogen generator 10 would be activated repeatedly, to maintain the minimum pressure in the N2 tank 28. Hence, the controller 36 in this case may be programmed to monitor the total N2 separation unit 26 run time over, e.g., 24 hours, and generate an alarm if that number is exceeded, even though each individual run time is not excessive.

In one embodiment, where the nitrogen generator 10 is deployed in an application where maintaining pressure is more important than the nitrogen gas purity, it ensures adequate pressurization of a downstream system even in the case of a complete failure of the N2 separation unit 26. For example, in a dry pipe FPS sprinkler, high purity nitrogen gas is preferred, to mitigate the risk of long-term corrosion. However, the more immediate concern is maintaining a supervisory gas pressure in the sprinkler system piping sufficient to hold the water valve closed. Accordingly, in one embodiment, a bypass path is provided from the output of the air dryer 16 to the nitrogen generator 10 N2 gas output. A normally-closed bypass valve 40 shuts off the bypass path during normal operation. Under a fault or failure mode that fails to provide sufficient gas pressure at the output, the controller 36 opens the bypass valve 40, allowing dried, compressed air to flow directly to the N2 gas output. In another embodiment, for increased reliability, the bypass path may begin at the N2 generator compressed air inlet— that is, directly at the output of the air compressor 12. However, the air dryer 16 (and other intervening components, such as liquid separator 14, are high reliability components unlikely to cause a pressure loss, and they provide some protection to the FPS sprinkler pipes by removing moisture from the compressed air. When the output gas pressure monitor 34 indicates sufficient nitrogen gas pressure, the controller 36 may automatically close the bypass valve 40, routing dried, compressed air again to the N2 separation unit 26.

In general, the controller 36 may comprise any one or more sequential state machines operative to execute machine instructions stored as machine-readable computer programs in memory, such as one or more hardware-implemented state machines (e.g., in discrete logic, FPGA, ASIC, etc.); programmable logic together with appropriate firmware; one or more stored-program, general-purpose processors, such as a microprocessor or Digital Signal Processor (DSP); or any combination of the above. The display 38 may comprise visual indicator, such as incandescent or LED lights, or an alphanumeric display capable of displaying text messages. In one embodiment, the display 38 is a touchscreen, which functions as both an input and output device to the controller 36.

In one embodiment, the controller 36 and comprises an integrated Human Machine Interface (HMI) and Programmable Logic Controller (PLC). A suitable HMI/PLC is the [model number] available from [supplier] of [city]. The controller 36 includes non-volatile memory, such as Flash memory or a magnetic or optical disk drive. The controller 36 preferably includes a real-time clock. In one embodiment, every time a gas pressure monitor 30, 32, 34 indicates a gas pressure below the respective predetermined pressure level, the controller 36, in addition to generating an alarm, logs the event, along with a timestamp, to non-volatile memory.

As used herein, "generating an alarm" means performing any known means of alerting users to the pressure or run time violation. Generating an alarm may comprise writing a warning or error message to the display. Alternatively or additionally, it may cause one or more lights to illuminate or flash, generate an audible alarm, or the like. In one embodiment, the controller 36 sends an indication of the pressure or run time violation to another device, such as a computer executing software that monitors and control building system (HVAC, lighting, etc.). In one embodiment, the controller 36 includes one or more wired or wireless communication interfaces, such as RS-232, Bluetooth, or the like, and may send warnings or error messages to other devices, such as smartphones.

Figure 3:
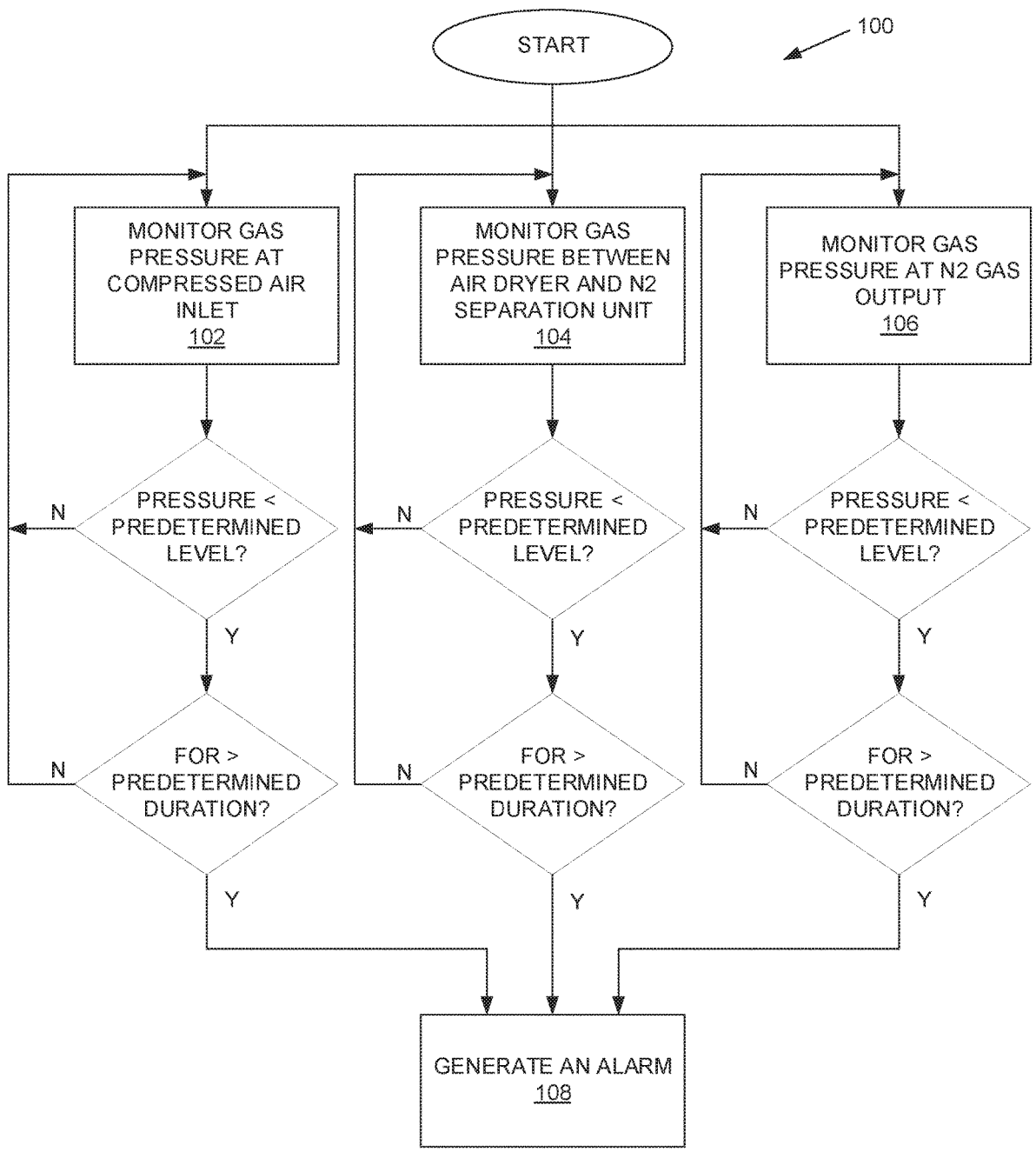
FIG. 3 is a flow diagram of a method of operating a nitrogen generator.

FIG. 3 depicts a method 100 of operating a nitrogen generator 10. The nitrogen generator 10 includes a compressed air inlet adapted to be connected to an air compressor 12 and to receive compressed air; an air dryer 16 operative to remove moisture from the compressed air received at the compressed air inlet; a nitrogen separation unit 26 operative to separate nitrogen gas from the dried air and to pass the nitrogen gas to a nitrogen gas output, a plurality of gas pressure monitors 30, 32, 34, and a controller 36. A gas pressure at the compressed air inlet is monitored (block 102). A gas pressure between the air dryer and the nitrogen separation unit is monitored (block 104). A gas pressure at the nitrogen gas output is monitored. For each of these pressure monitoring steps 102, 104, 106, if the monitored gas pressure falls below a respective predetermined pressure level, and remains below that level for greater than a respective predetermined duration, then an alarm is generated (block 108).

As indicated by the decision blocks and method flow arrows, so long as all gas pressure monitors 30, 32, 34 indicate that the respective monitored pressure is above the respective predetermined pressure level, the nitrogen generator 10 continues to operate normally. Furthermore, even if one of the pressure monitoring steps 102, 104, 106 indicates a low pressure, if the lower-than-threshold pressure does not persist for greater than the respective predetermined duration, the nitrogen generator 10 continues to operate normally. Only if one or more of the pressure monitoring steps 102, 104, 106 indicate a gas pressure below the respective predetermined pressure level, and at least one of them indicate that it remains at below the respective predetermined pressure level for at least the respective predetermined duration, does the controller 36 generate an alarm. Note that both the respective predetermined pressure level and the respective predetermined duration may, in general, be different for each gas pressure monitoring step 102, 104, 106. Of course, in some embodiments, all of the respective predetermined pressure levels may be the same, and/or all of the respective predetermined durations may be the same.

Embodiments of the present invention present numerous advantages over the prior art. While it is known to monitor process parameters such as temperature and pressure in industrial processes, prior art nitrogen generators do not continuously and simultaneously monitor the gas pressures at multiple critical points of the nitrogen generation process. Multiple such gas pressure monitors are advantageous, as "normal" operating pressure may be different at different points in the process (e.g., the output pressure of a membrane type N2 separation unit 26 is typically lower than its input pressure). Furthermore, false positive warnings are dramatically reduced by requiring that a detected low pressure must persist for greater than a respective predetermined duration to generate the warning. For example, periodic short pressure fluctuations at the output of a PSA type N2 separation unit 26 are to be expected, as CMS media beds alternate between active N2 separation and regeneration. The additional monitoring of N2 separation unit 26 run time, and the provision of a bypass air path, optimize the nitrogen generator 10 for particular applications.

The terms "predetermined pressure level," "threshold," and "setpoint" are used interchangeably herein. As used herein, the term "connected to" means connected in gas flow relationship, with possibly intervening components. In contrast, the term "directly connected to" means connected in gas flow relationship, without any intervening component. "Monitoring" a gas pressure includes two related functions: sensing a pressure, and comparing the sensed pressure to a threshold or setpoint. As used herein, the term "gas pressure monitor" may refer to a pressure sensor which senses a gas pressure, with the comparison to a setpoint performed in a controller, or it may refer to a fixed or adjustable pressure switch, which merges the sensing and comparison functions by, e.g., actuating a switch only when a monitored gas pressure exceeds a fixed or adjustable value. As used herein, the method step "monitoring a gas pressure" may comprise separately sensing a gas pressure by a pressure sensor and then comparing the sensed pressure to a setpoint in the controller, or it may refer to a merged operation wherein the presence of a signal at the controller indicates that a monitored gas pressure exceeds a fixed or adjustable pressure level.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A nitrogen generator, comprising:
    a compressed air inlet adapted to be connected to an air compressor, and to receive compressed air;
    a gas pressure monitor connected to the inlet;
    an air dryer operative to remove moisture from the compressed air received at the compressed air inlet;
    a gas pressure monitor connected to an output of the air dryer;
    a nitrogen separation unit operative to separate nitrogen gas from the dried, compressed air, and to pass the nitrogen gas to a nitrogen gas output;
    a gas pressure monitor connected to the nitrogen gas output; and
    a controller connected to the gas pressure monitors, and adapted to generate an alarm if any monitored gas pressure falls below a respective predetermined pressure level for greater than a respective predetermined duration.

2. The nitrogen generator of claim 1 wherein the nitrogen separation unit comprises one of a membrane, and one or more carbon molecular sieve (CMS) beds.

3. The nitrogen generator of claim 2 wherein the controller is further adapted to monitor a run time of the nitrogen separation unit, and to generate an alarm if the run time exceeds a predetermined maximum continuous run time duration.

4. The nitrogen generator of claim 3 further comprising
    a bypass valve between the air dryer and the nitrogen separation unit; and
    a bypass air path connecting the bypass valve to the nitrogen gas output and bypassing the nitrogen separation unit; and
    wherein the controller is further adapted to open the bypass valve and route dried, compressed air directly to the nitrogen gas output in response to either the gas pressure at the nitrogen gas output falling below the respective predetermined pressure level or the nitrogen separation unit run time exceeding the predetermined maximum continuous run time duration.

5. The nitrogen generator of claim 3 wherein the controller is connected to a display, and wherein generating an alarm comprises displaying an alarm message on the display.

6. The nitrogen generator of claim 5 wherein the controller further comprises non-volatile memory, and wherein generating an alarm further comprises logging a record of the pressure loss or run time violation to the non-volatile memory.

7. The nitrogen generator of claim 1 wherein the predetermined pressure levels for all gas pressure monitors are the same.

8. The nitrogen generator of claim 1 wherein a first predetermined pressure level for at least a first gas pressure monitor is different than a second predetermined pressure level for a second gas pressure monitor.

9. The nitrogen generator of claim 1 wherein the predetermined durations for all gas pressure monitors are the same.

10. The nitrogen generator of claim 9 wherein the predetermined durations are 30 seconds.

11. The nitrogen generator of claim 1 wherein a first predetermined duration for at least a first gas pressure monitor is different than a second predetermined duration for a second gas pressure monitor.

12. The nitrogen generator of claim 1 wherein at least one gas pressure monitor comprises a preset or adjustable pressure switch adapted to actuate at the predetermined pressure level.

13. The nitrogen generator of claim 12 wherein the pressure switch actuating causes a voltage to be applied to a corresponding input of the controller.

14. A method of operating a nitrogen generator comprising a compressed air inlet adapted to be connected to an air compressor and to receive compressed air, an air dryer operative to remove moisture from the compressed air received at the compressed air inlet, a nitrogen separation unit operative to separate nitrogen gas from the dried air and to pass the nitrogen gas to a nitrogen gas output, a plurality of gas pressure monitors, and a controller, the method comprising:

monitoring a gas pressure at the compressed air inlet;

monitoring a gas pressure between the air dryer and the nitrogen separation unit;

monitoring a gas pressure at the nitrogen gas output; and generating an alarm if any monitored gas pressure falls below a respective predetermined pressure level for greater than a respective predetermined duration.

15. The method of claim 14 further comprising monitoring a run time of the nitrogen separation unit, and generating an alarm if the run time exceeds a predetermined maximum continuous run time duration.

16. The method of claim 15 wherein the nitrogen generator further comprises a bypass valve between the compressed air inlet and the air dryer and a bypass air path connecting the bypass valve to the nitrogen gas output and bypassing the air dryer and nitrogen separation unit, the method further comprising:

opening the bypass valve and routing compressed air directly to the nitrogen gas output in response to either the gas pressure at the nitrogen gas output falling below the respective predetermined pressure level or the nitrogen separation unit run time exceeding the predetermined maximum continuous run time duration.

17. The method of claim 16 wherein the controller is connected to a display, and wherein generating an alarm comprises displaying an alarm message on the display.

18. The method of claim 14 wherein the predetermined durations are all 30 seconds.

19. The method of claim 14 wherein at least one gas pressure monitor comprises a preset or adjustable pressure switch adapted to actuate at the predetermined pressure level.

20. The method of claim 19 wherein the pressure switch actuating causes a voltage to be applied to a corresponding input of the controller.

* * * * *